(12) United States Patent
Martin

(10) Patent No.: US 7,239,892 B2
(45) Date of Patent: Jul. 3, 2007

(54) ALTERNATING CURRENT POWER STRIP WITH NETWORK REPEATING AND MANAGEMENT

(75) Inventor: Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 0 days.

(21) Appl. No.: 11/029,167

(22) Filed: Jan. 3, 2005

(65) Prior Publication Data

US 2006/0148403 A1    Jul. 6, 2006

(51) Int. Cl.
*H04B 1/38* (2006.01)

(52) U.S. Cl. ............... 455/557; 370/328; 370/338; 455/554.2

(58) Field of Classification Search ............... 320/328, 320/357, 338; 434/535; 200/51
See application file for complete search history.

(56) References Cited

U.S. PATENT DOCUMENTS

| 5,903,558 A * | 5/1999 | Jones et al. ............... 370/351 |
| 2004/0121648 A1 * | 6/2004 | Voros ............... 439/535 |
| 2004/0188231 A1 * | 9/2004 | Chen et al. ............... 200/51 R |
| 2005/0152306 A1 * | 7/2005 | Bonnassieux et al. ...... 370/328 |
| 2005/0152323 A1 * | 7/2005 | Bonnassieux et al. ...... 370/338 |
| 2006/0002331 A1 * | 1/2006 | Bhagwat et al. ............ 370/328 |
| 2006/0038499 A1 * | 2/2006 | Yeh ............... 315/149 |

* cited by examiner

*Primary Examiner*—Joseph Feild
*Assistant Examiner*—David Q. Nguyen
(74) *Attorney, Agent, or Firm*—LaRiviere, Grubman & Payne, LLP

(57) ABSTRACT

An alternating current power strip 1 with network repeating and management 23 functionality is hereby disclosed.

19 Claims, 6 Drawing Sheets

ALTERNATING CURRENT POWER STRIP WITH NETWORK REPEATING AND MANAGEMENT

TECHNICAL FIELD

The presently claimed invention relates to the consumer electronics field. More particularly, the presently claimed invention relates to improved wireless computer networking. Even more particularly, the presently claimed invention relates to wireless computer networking technology expanded to include alternating current (AC) power supply functionality.

BACKGROUND ART

Regardless of the wireless networking protocol utilized, traditional wireless internet gateway computer devices almost always come in two pieces. The internet gateway wireless device (WiFi) typically contains the wired network ports and circuitry needed to send and receive data. The internet gateway wireless device draws its power from a separate AC power supply which converts the alternating current electrical output to a required direct current (DC) voltage supply.

The described two part system has a number of weaknesses, not the least of which include the risk of losing the internet connection when the power supply gets accidentally disconnected and unplugged from the internet gateway. The power connection between the device and related power supply is often held together by a slight spring force within the socket. Diagnosing internet connectivity failures can be a non-trivial task, which is not made easier by the two component system. The long cord commonly found on wireless gateway power supplies presents a tangle and trip hazard which can easily result in loss of power to the gateway component when the power supply becomes accidentally unplugged. Consequently, since the introduction of the two component configuration there has been a need for a more robust wireless networking internet gateway device which does not present electrical connectivity challenges.

DISCLOSURE OF THE INVENTION

To overcome the described limitations of the two component wireless internet gateway, the claimed invention incorporates the wireless internet gateway circuitry into an AC power strip device. The reference to wireless internet gateway can be by way of a direct wired connection and alternately can be by way of a wireless 'repeater' device in the power strip which is designed to amplify and forward the received WiFi signal on to another remote gateway device. The power strip with WiFi repeater as described overcomes the risk of accidental power loss due to the substantial difference between the traditional WiFi power supply connector and reduced likelihood of accidental disconnect with an AC power strip.

By incorporating the WiFi device into the power strip one immediate benefit is the protection of the WiFi device from electrical problems. The power strip provides protection from power surges, and can also incorporate a battery backup for 'uninterruptible power supply' or UPS fault coverage. One aspect of convenience of the device is that with a traditional WiFi device an external power supply uses up an outlet that would otherwise be available to some other device. By combining the two into one device with an internal power supply for the network component, no external outlet is required to power the network component, an extension cord is provided in the corded embodiment, and, in effect, additional outlets are also available for other devices such as computers, printers, AV components and others.

Since the WiFi device is a transmitter, a novel application of the claimed invention includes the transmission of power characteristics on an outlet by outlet basis as well as an entire 'system state' report.

Internet information is provided to the device through a hardwired source unless the device is operating as a 'repeater' to relay data to a separate gateway. When operating in direct connection with the internet, data either comes in through a traditional Ethernet port or through the AC power supply itself. When Internet information is received from the AC power supply itself it can be rerouted through the device through WiFi, Ethernet, USB (including USB 1.0, 1.1 and 2.0) and coaxial ports. Gateway functionality also provides data routing among all three data pathways including wireless, port based (including Ethernet, USB and coaxial) and AC power based.

Internet information is also provided in alternate variants where the internet modem is also internal to the power strip. Equivalent power reliability and protection benefits are realized, and interoperability between internal DSL or cable modem and wireless network repeaters is improved. Wireless networking is provided either through an internal antenna or external antenna variant.

BRIEF DESCRIPTION OF THE DRAWINGS

For a better understanding of the present invention, reference is made to the accompanying drawings numbered below. Commonly used reference numbers identify the same or equivalent parts of the claimed invention throughout the several figures.

MODES FOR CARRYING OUT THE INVENTION

Figure 1:
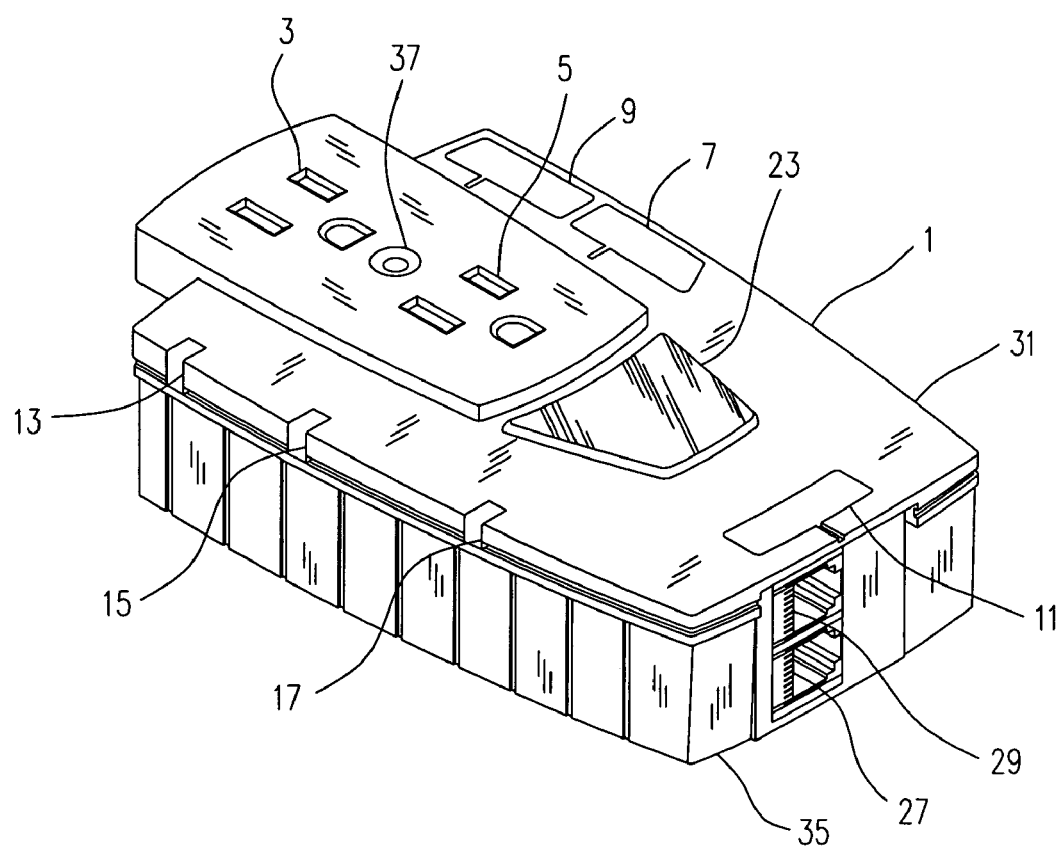
FIG. 1 is a perspective view of the first embodiment of the claimed device.

FIG. 1 is a perspective view of the first embodiment of the claimed device. Device 1 provides alternating current power through receptacles 3, 5. Device 1 is anchored to a surface through hole 37 for additional stability. Electrical items drawing power through receptacles 3, are labeled with identifying placards 7, 9 and status of receptacles 3, 5 are provided by power indicator lights 13, 15. Wired data capabilities are by way of Ethernet data ports 27, 29 which are identified by placard 11 and data status indicator light 17. Wireless data capabilities are provided by internal WiFi component 23. Device 1 is encompassed by upper plate 31 and lower housing 35.

Figure 2:
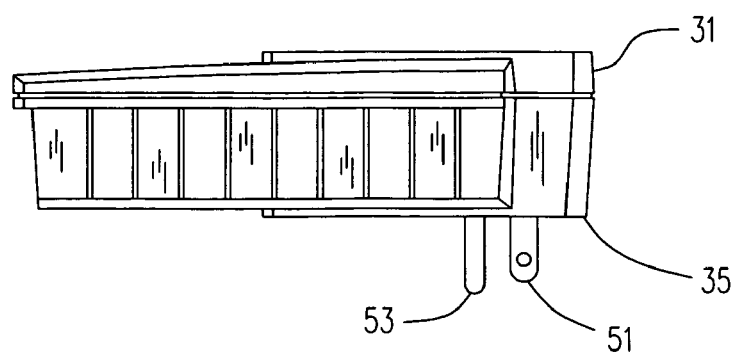
FIG. 2 is a right elevation view of the first embodiment of the claimed device.

FIG. 2 is a right elevation view of the first embodiment of the claimed device. In this illustration the device is housed by upper plate 31 and lower housing 35 also depicts grounding pin 53 and hot pin 51.

Figure 3:
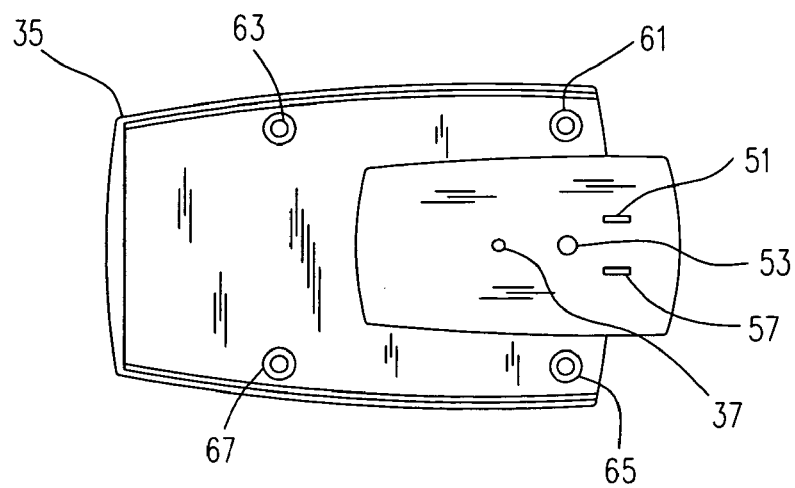
FIG. 3 is a bottom plan view of the first embodiment of the claimed device.

FIG. 3 is a bottom plan view of the first embodiment of the claimed device. In this illustration lower housing 35 includes support feet 61, 63, 65, 67, hole 37 and also depicts grounding pin 53, neutral pin 57 and hot pin 51.

Figure 4:
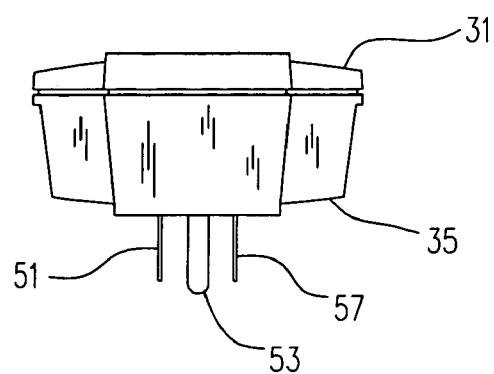
FIG. 4 is a front elevation view of the first embodiment of the claimed device.

FIG. 4 is a front elevation view of the first embodiment of the claimed device. In this illustration the device is housed by upper plate 31 and lower housing 35 also depicts grounding pin 53, neutral pin 57 and hot pin 51.

Figure 5:
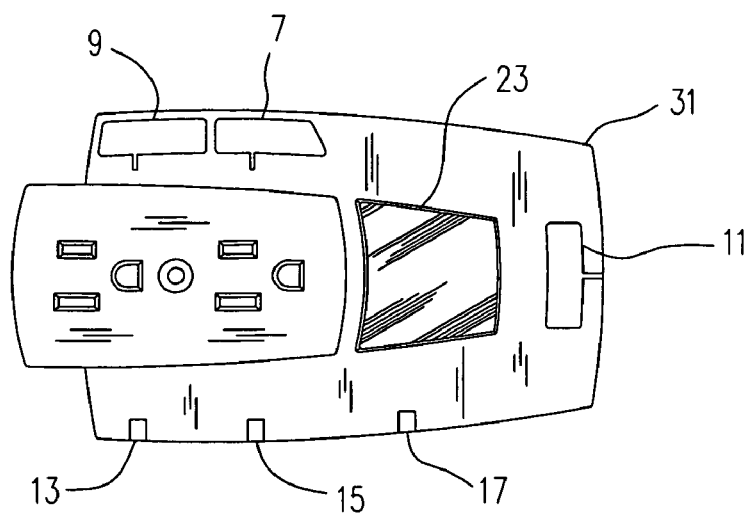
FIG. 5 is a top plan view of the first embodiment of the claimed device.

FIG. 5 is a top plan view of the first embodiment of the claimed device. The device powers electronic items which are identified with identifying placards 7, 9 with network connectivity specifics identified by placard 11. Status of powered devices is provided by power indicator lights 13, 15. Wireless data capabilities are provided by internal WiFi component 23. Internal WiFi component 23 has two embodiments, one which relies upon an internal antenna (not shown) and another foreseeable variant which utilizes an external antenna. WiFi component 23 can either act as a primary internet gateway or as a secondary repeater device to link to another wireless gateway device. Device 1 is encompassed by upper plate 31.

Figure 6:
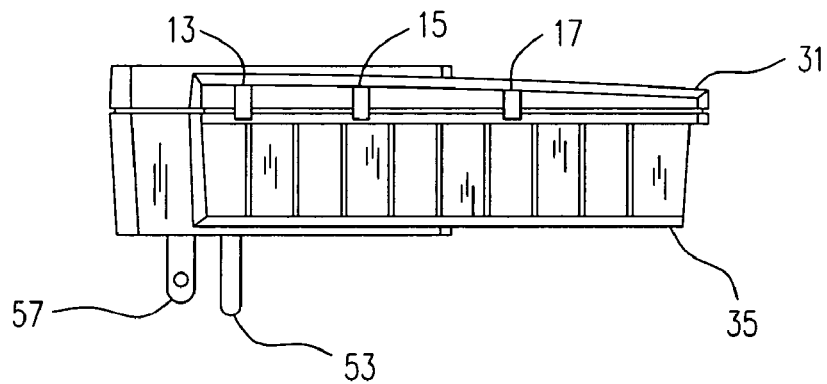
FIG. 6 is a left elevation view of the first embodiment of the claimed device.

FIG. 6 is a left elevation view of the first embodiment of the claimed device. In this illustration the device is housed by upper plate 31 and lower housing 35 also depicts grounding pin 53 and neutral pin 57. Alternating current connectivity is represented by indicator lights 13, 15 and data connectivity is provided by data indicator light 17. Data indicator light 17 reports data connectivity based on proportional rate flashing corresponding to data throughput and can change color based on internal network data versus Internet packet data. Sequential light blinking can also be used for network debugging.

Figure 7:
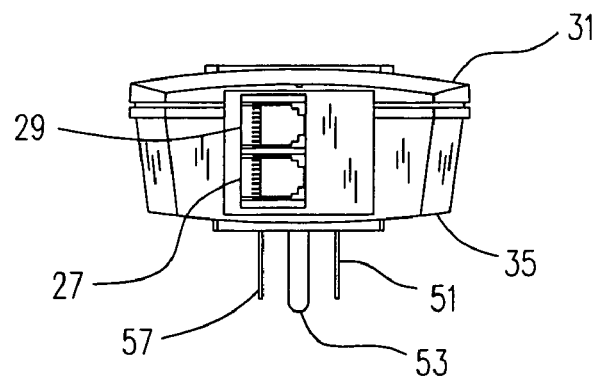
FIG. 7 is a back elevation view of the first embodiment of the claimed device.

FIG. 7 is a back elevation view of the first embodiment of the claimed device. In this illustration the device is housed by upper plate 31 and lower housing 35 show Ethernet data ports 27 and 29. Internet connectivity is obtained through either port and provided as WiFi connectivity by the device. Line conditioning of connected Ethernet cables is also provided. FIG. 7 also depicts grounding pin 53, neutral pin 57 and hot pin 51.

Figure 8:
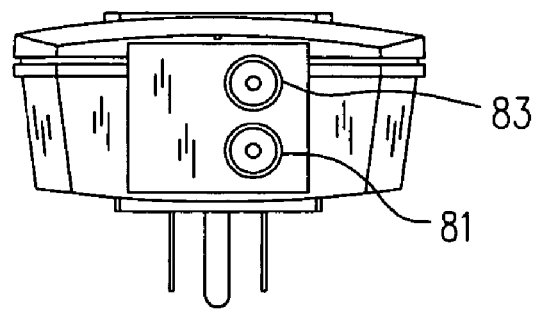
FIG. 8 is a back elevation view of a second embodiment of the claimed device.

FIG. 8 is a back elevation view of a second embodiment of the claimed device. In this illustration the second embodiment of the device receives internet connectivity from coaxial cable ports 81, 83. Internet connectivity is obtained through either port and provided as WiFi connectivity by the device. In one variant the device includes cable modem functionality in addition to WiFi connectivity. Line conditioning of coaxial cables is also provided.

Figure 9:
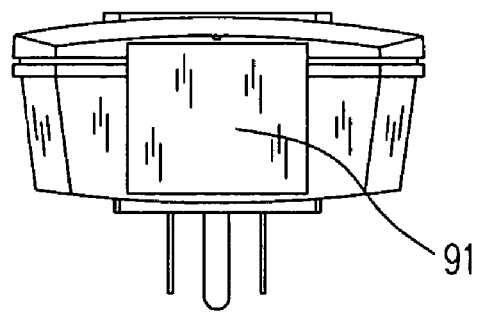
FIG. 9 is a back elevation view of a third embodiment of the claimed device.

FIG. 9 is a back elevation view of a third embodiment of the claimed device. In this illustration the device third embodiment receives internet connectivity from directly from the AC power source. Consequently, no external data ports are needed to provide WiFi internet access since internal AC power networking 91 is used to provide connectivity to WiFi circuitry (not shown).

Figure 10:
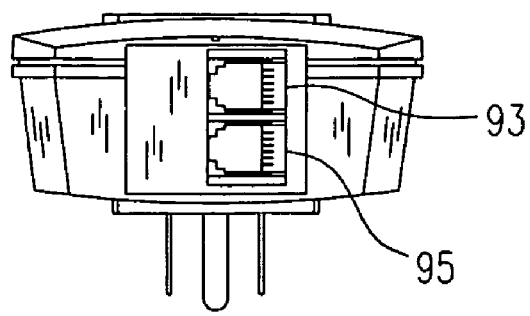
FIG. 10 is a back elevation view of a fourth embodiment of the claimed device.

FIG. 10 is a back elevation view of a fourth embodiment of the claimed device. In this illustration device 1 fourth embodiment receives internet connectivity from telephone ports 93, 95. Internet connectivity is obtained through either port and provided as WiFi connectivity by the device. In one variant the device includes DSL decoding functionality in addition to WiFi connectivity. Conditioning of phone lines is also provided.

Figure 11:
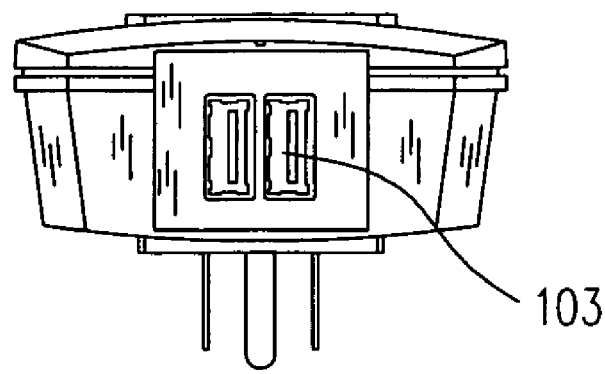
FIG. 11 is a back elevation view of a fifth embodiment of the claimed device.

FIG. 11 is a back elevation view of a fifth embodiment of the claimed device. USB port 103 provides internet and computer access as well as line conditioning functionality.

Figure 12:
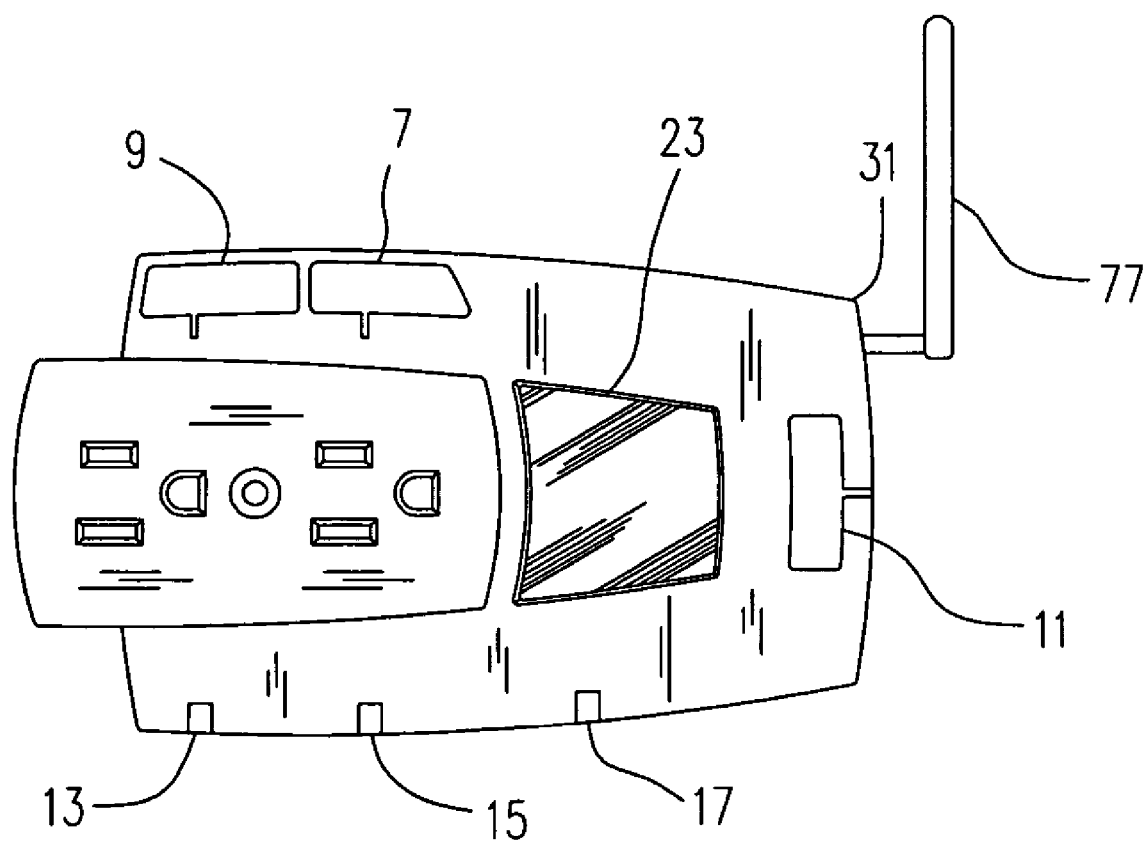
FIG. 12 is a top plan view of a sixth embodiment of the claimed device.

FIG. 12 is a top plan view of a sixth embodiment of the claimed device. The device powers electronic items which are identified with identifying placards 7, 9 with network connectivity specifics identified by placard 11. Status of powered devices is provided by power indicator lights 13, 15. Wireless data capabilities are provided by internal WiFi component 23 and status is indicated by light 17. Internal WiFi component 23 is connected to an external antenna 77 for greater range and wireless connectivity options. WiFi component 23 can either act as a primary internet gateway or as a secondary repeater device to link to another wireless gateway device. Device 1 is encompassed by upper plate 31.

Figure 13:
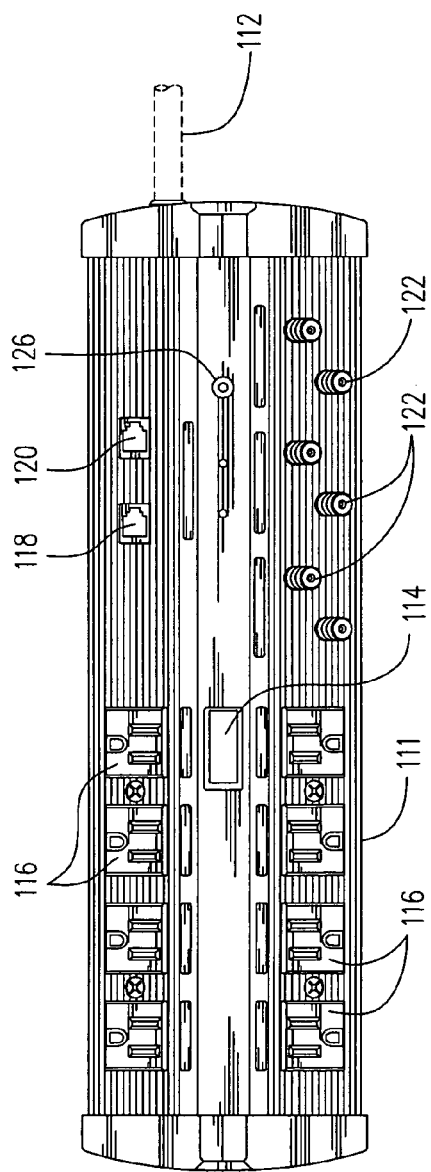
FIG. 13 is a top plan view of a seventh embodiment of the claimed device.

FIG. 13 is a top plan view of a seventh embodiment of the claimed device. In this embodiment, device 111 is corded 112 for AC power and more flexible device placement options, Device 111 contains internal WiFi component 114, network status indicator light 126, coaxial ports 122, ethernet ports 118, 120 and power outlets 116.

Figure 14:
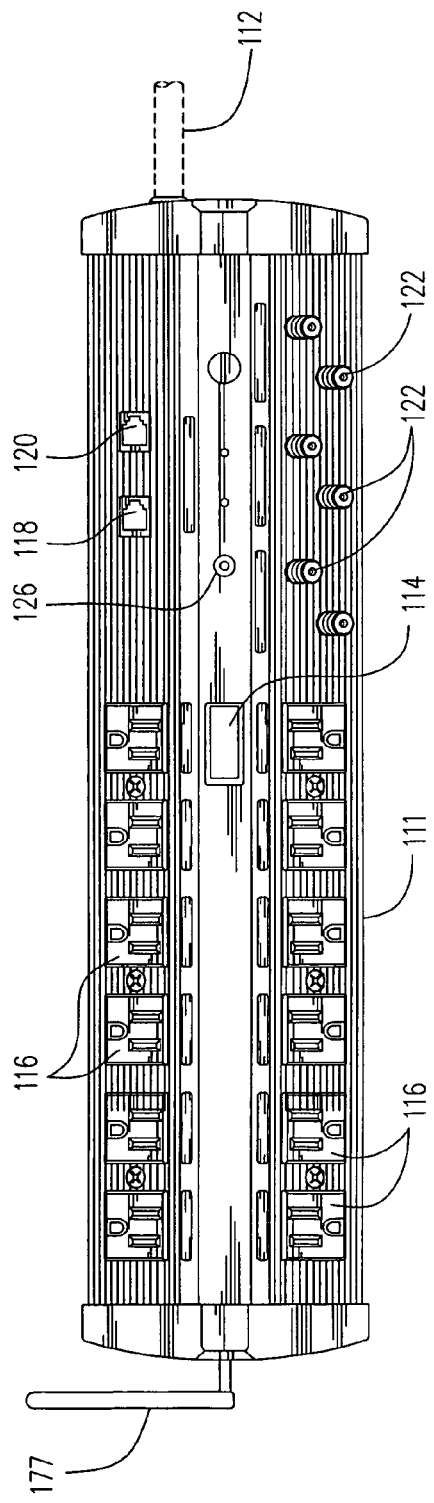
FIG. 14 is a top plan view of an eighth embodiment of the claimed device.

FIG. 14 is a top plan view of an eighth embodiment of the claimed device. In this embodiment, device 111 is corded 112 for AC power and more flexible device placement options, Device 111 contains internal WiFi component 114, external WiFi antenna 177, network status indicator light 126, coaxial ports 122, ethernet ports 118, 120 and power outlets 116.

Information as herein shown and described in detail is fully capable of attaining the above-described object of the invention, the presently preferred embodiment of the invention, and is ,thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, apparatus material, and fabrication material detail may be made without departing from the spirit and scope of the invention as set forth in the appended claims. No claim herein is to be construed under the provisions of 35 U.S.C. 112, sixth paragraph, unless the element is expressly recited using the phrase "means for."

INDUSTRIAL APPLICABILITY

The claimed invention has industrial applicability in the retail electronics marketplace. Moreover, the claimed invention also has industrial applicability in any environment where secure wireless computing is desired.

What is claimed:

1. An enhanced WiFi device comprising:
a wireless networking component integrated into an alternating current power device with one or more additional alternating current power sockets, wherein said WiFi device additionally comprises an Internet gateway component coupled with the wireless network component for receiving and transmitting data through the alternating current power source,
and wherein said WIFI device additionally comprises a means for indicating the alternating current power source, means for indicating the individual power outlet power characteristics, and means for wirelessly transmitting at least one information status selected from the group consisting of input power status and individual power outlet power status.

2. The enhanced WiFi device of claim 1 wherein said Internet gateway component additionally comprises an internal cable modem device.

3. The enhanced WiFi device of claim 1 wherein said Internet gateway component additionally comprises coaxial cable connectivity.

4. The enhanced WiFi device of claim 1 wherein said Internet gateway component additionally comprises an internal digital subscriber line modem device.

5. The enhanced WiFi device of claim 1 wherein said Internet gateway component additionally comprises telephone line connectivity.

6. The enhanced WiFi device of claim 1 wherein said Internet gateway component additionally comprises one or more Ethernet ports.

7. The enhanced WiFi device of claim 1 wherein said wireless networking component additionally comprises wireless repeater logic to receive and forward wireless packet information from another wireless Internet gateway.

8. The enhanced WiFi device of claim 1 further having means for monitoring the status of the input power supply.

9. The enhanced WiFi device of claim 8 further having means for monitoring the individual power outlet power characteristics.

10. The enhanced WiFi device of claim 9 further having means for wirelessly transmitting at least one information status selected from the group consisting of input power status and individual power outlet power status.

11. The enhanced WiFi device of claim 8 further having means for monitoring the individual power outlet power characteristics and
means for wirelessly transmitting at least one information status selected from the group consisting of input power status and individual power outlet power status.

12. The enhanced WiFi device of claim 9 further having means for providing protection from power supply surges.

13. The enhanced WiFi device of claim 12 further having means for monitoring the individual power outlet power characteristics and means for wirelessly transmitting at least one information status selected from the group consisting of input power status and individual power outlet power status.

14. The enhanced WiFi device of claim 1 further having means for conditioning at least one device selected from the group consisting of coaxial cable, digital subscriber line, telephone line, and Ethernet line.

15. An enhanced WiFi device comprising:
a wireless networking component integrated into an alternating current power device with one or more additional alternating current power sockets, an Internet gateway component coupled with the wireless network component for receiving and transmitting data through the alternating current power source, a status indicator light providing data transmission and reception state status and wherein said WIFI device additionally comprises a means for indicating the alternating current power source, means for indicating the individual power outlet power characteristics, and means for wirelessly transmitting at least one information status selected from the group consisting of input power status and individual power outlet power status.

16. The enhanced WiFi device of claim 15 further having means for providing protection from power supply surges.

17. The enhanced WiFi device of claim 16 further having means for monitoring the alternating current power source,
Means for monitoring the individual power outlet power characteristics and
means for wirelessly transmitting at least one information status selected from the group consisting of input power status and individual power outlet power status.

18. The enhanced WiFi device of claim 15 further having at least one component selected from the group of components consisting of an internal cable modem device, coaxial cable connectivity device, internal digital subscriber line modem device, telephone line connectivity device, Ethernet port, and wireless repeater logic device.

19. The enhanced WiFi device of claim 18 further having means for conditioning at least one device selected from the group consisting of coaxial cable, digital subscriber line, telephone line, and Ethernet line.

* * * * *